Aug. 19, 1941.                S. M. LEVY                 2,252,715
                GLARE SHIELD STRUCTURE FOR AUTOMOBILES
                       Filed April 26, 1940
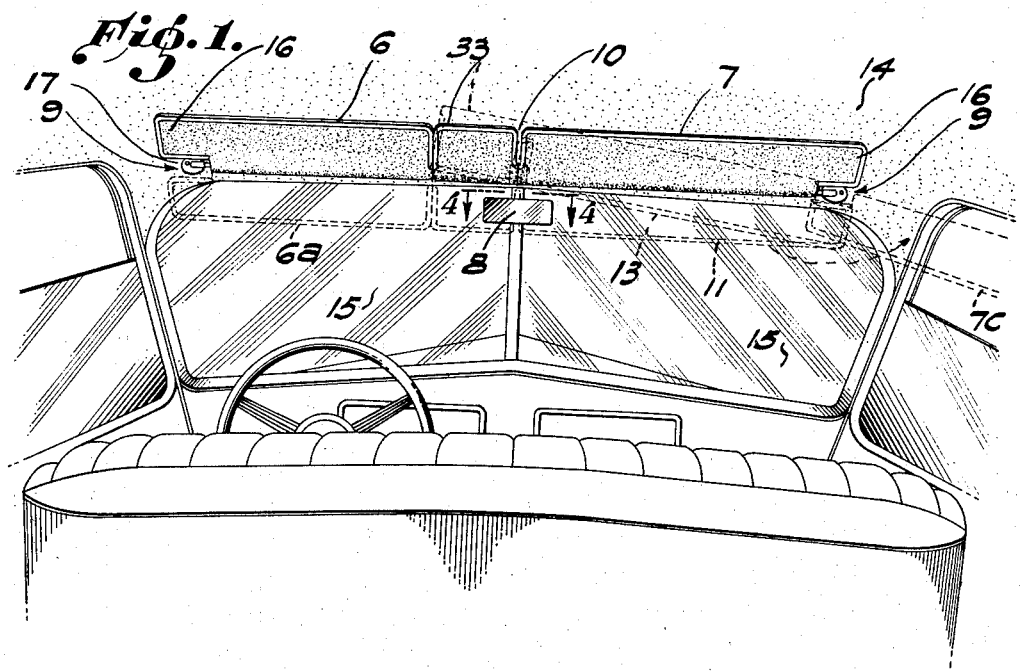
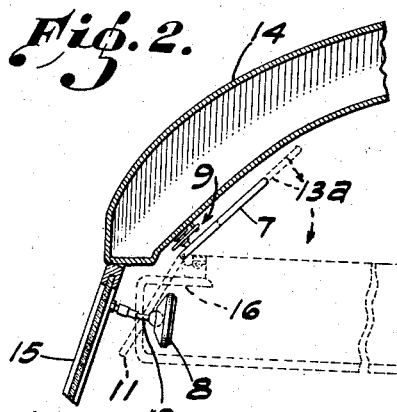
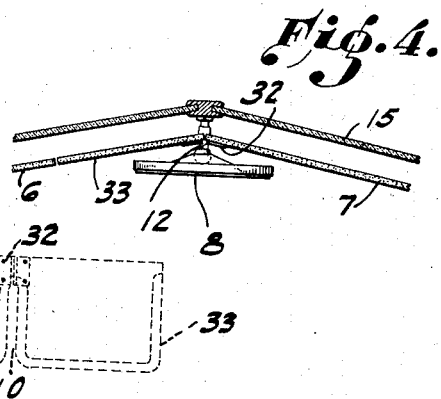
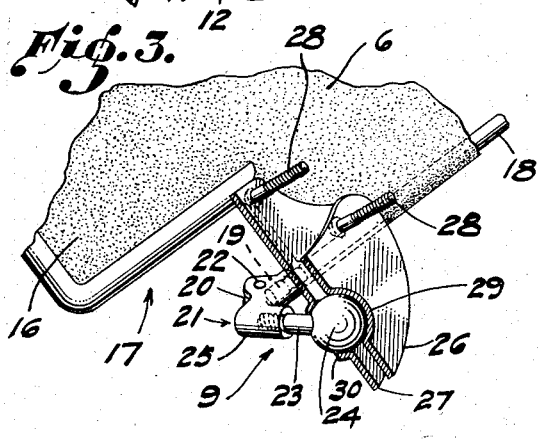
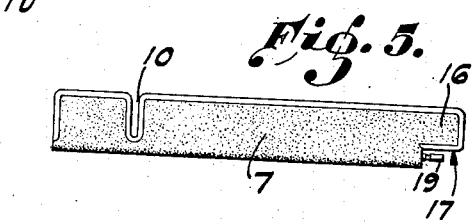
SOLOMON M. LEVY,
           INVENTOR.
BY
           ATTORNEY.

Patented Aug. 19, 1941

2,252,715

UNITED STATES PATENT OFFICE 2,252,715

GLARE SHIELD STRUCTURE FOR AUTOMOBILES

Solomon M. Levy, Los Angeles, Calif., assignor to Inventions & Specialties, Inc., Los Angeles, Calif.

Application April 26, 1940, Serial No. 331,841

13 Claims. (Cl. 296—97)

The present invention relates to sun and glare obstructing apparatus for automobiles, and particularly to improvements in my Sun visor for automobiles, patented June 20, 1939, No. 2,163,495.

It is a particular object of the present invention to improve upon the apparatus set forth in said patented device by integralizing the central sun visors and side visor in a novel manner.

Another object is to provide an improved glare shield extending from one end of the windshield to a point beyond the center of the machine and provided with a slot adapted to cooperate with the shank of the rear vision mirror, thereby reducing the number of parts without any detriment to function.

A further object is to provide an improved combination front, side and front center glare shield for automobiles which is fastened at one end of the windshield, in combination with a glare shield of less extent similarly mounted at the opposite end of the windshield, such shields embodying new shapes and each cooperating to completely obstruct the entrance of glare through any part of the windshield.

A still further object of the invention is to provide a glare shield having a wing extending under its pivotal mounting to obstruct glare entering at the extreme sides of the windshield.

Yet a further object of the invention resides in the improved manner of slotting a glare shield to exclude center sunlight, whether or not provision is made for flexion of the windshield at its slotted portion.

Still a further object of the invention is to provide a glare shield having a hinged flap pivoted to swing about a joint in alinement with a slot cut into it to facilitate mounting it in its operative position in contiguity with a glare shield of a shorter dimension mounted at the opposite side of the windshield.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Referring to the accompanying drawing, which illustrates what are at present deemed to be preferred embodiments of the invention, Fig. 1 is a perspective view looking from a point rearward of the driver's seat toward the windshield of an automobile equipped with the device. In this view the improved glare shield structure is shown in the inoperative position in full lines and in the operative position in dotted lines.

Fig. 2 is a side elevation of a fragment of the device looking from the center toward the right of the structure shown in Fig. 1, a fragment of the roof of a car being shown.

Fig. 3 is a perspective fragmental section taken through the ball joint plates showing the pivotal mounting of the glare shields.

Fig. 4 is a section taken on line 4—4 of Fig. 1.

Fig. 5 is a modified showing of the glare shield per se shown at the right in Fig. 1.

In the embodiment of the invention illustrated in Figs. 1 to 4, the improved glare shield structure comprises a pair of elongated plate-like glare shields 6 and 7. The shorter glare shield 6 is shown at the left of the rear vision mirror 8, while the main shield 7 is shown extending from the right to a point past the mid-center of the automobile beyond the rear vision mirror and adapted to be operated in such a manner as to have its free end edge brought into contiguity with the extreme right end edge of the shorter shield 6.

Shield 7 is provided with a slotted edge portion 10 which when the shield is in the operative position 11 is adapted to straddle the shank 12 of the rear vision mirror 8 mounted in the center of the automobile as shown in Figs. 1, 2, and 4. This operation is effected by swinging the shield downwardly in a vertical plane in front of the rear vision mirror and then swinging it in an edgewise manner in a vertical plane as indicated by the dotted lines 13 in Fig. 1 and 13a in Fig. 3 to a position wherein it may be finally moved downward in back of the mirror. Hence, the mirror 8 when once adjusted to the driver's convenience need not thereafter be moved. Neither will the glare shield in any way obstruct the driver's vision into the mirror and all center sunlight will thus be obstructed from entering the driver's compartment, which would impair his vision on account of extreme brightness.

Means 9, shown in Fig. 3, is provided to pivotally mount one end portion of said shield in an upper front corner of an automobile frame 14 adjacent to the windshield 15, and the other said shield 6 in the opposite front corner thereof, both of said shields, with their wing extensions 16, spanning the width of the windshield.

Each of said glare shields has a recess 17 in one of its corner portions in which said pivotal mounting is located, thereby narrowing the width of the end portion of the plate in which said recess is located to form said wing extensions 16. A rod 18 having a projecting end portion 19 of less width than said recess 17 projects from a side edge of each shield into the outer portion of said recess. The projecting end portion 19 of said rod is mounted in the split socket 20 provided in bearing 21, clamping screw 22 being utilized to secure said end portion 19 detachably therein. Bolt 23, having a globular head 24, is screwed into the body portion 25 of the bearing 21, the head 24 providing a universal ball joint about which the shields 6 and 7 swing in an edgewise manner in certain movements of their swing to and from the inoperative position. Each end portion 19 of the rod 18 is rotatably mounted in the bearing 21, and each shield is swingable with said rod.

Head 24 is seated within a socket provided by the cooperating plates 26 and 27, said plates being joined together by screw bolts 28, two of which are shown in Fig. 3. In addition to joining the plates 26 and 27 together, said bolts from time to time may be adjusted to compensate for any wear which may take place between the head 24 and the socket provided by said plates. Bolts 28 are made long enough to fasten the assembled plates to the automobile frame.

Plate 26 is provided with a concavity 29, and plate 27 is provided with a scalloped opening 30, said concavity and scalloped opening being brought into juxtaposition after the bolt 23 has been inserted and screw bolts 28 applied in the assembled relation of parts shown in Fig. 3.

In order for both of the shields 6 and 7 to follow the contour of the V-shaped windshield shown in the drawing, I provide a hinge 32 adjacent the slot 10 in order that the free end portion 33 of the shield may be flexed along a line passing through the center of the slot as shown in Fig. 4 whereby the free end edges of each shield are brought into contiguity.

When the windshield is straight, the hinge 32 will be omitted from the shield 7, as shown in the modification illustrated in Fig. 5.

In the operation of the shields for completely shutting out glare entering through the windshield 15, the shield 6 is simply swung with the shaft 18 in a vertical plane to the dotted operative position 6a. From the dotted operative position 6a the shield may also be swung through a horizontal position to the left to occupy a position similar to that of the dotted position 7c of shield 7.

The shield 7 having a pivotal mounting like shield 6 is swingable in a similar fashion to a downward position. However, if left in this position the shield would render the mirror 8 wholly ineffective. Hence, it will be seen some means must be provided whereby at least the shield 7 can be adjusted in an edgewise manner to bring it to the rear of the mirror. This has previously been set forth in the disclosure relating to the ball and socket joint. Continuing the movement in the operation of the shield after the down position is assumed, the shield is swung in an edgewise manner in a plane at a right angle to the longitudinal axis of the automobile from the down position to the dotted position 13 or 13a until the lower edge of the shield clears the upper right hand corner of the rear vision mirror, from which position the shield is swung in an edgewise manner in back of the mirror with the slot 10 straddling the shank 12. Lastly, the part 33 is brought into alignment with the free end edge of shield 6 through the medium of the hinge 32 as shown in Fig. 4.

From said down position the shield 7 may be rotated through a horizontal plane to the dotted position 7c.

The wing extensions 16 exclude the glare which formerly was permitted to enter between the outside ends of present shields and the windshield.

What is claimed is:

1. In combination, a main elongated glare shield member, means for pivotally mounting one end portion of said member upon the frame of an automobile adjacent to an upper corner of a windshield, said member being of a sufficient length to extend from its pivotal mounting to a point beyond the mid-width of the automobile, a shorter elongated glare shield member similarly mountable adjacent the upper corner of the opposite end of the windshield having an unsupported free end edge abuttable against the free end edge of the aforesaid main glare shield member when said shields are operatively related, said main member having a slotted edge portion to straddle the shank of a rear vision mirror mounted in the center of the automobile when the latter shield is moved to its operative position.

2. Means to prevent glare entering the driver's compartment of an automobile comprising a pair of elongated glare shields, means to pivotally mount one of said shields in an upper, front corner of an automobile adjacent to the windshield and the other of said shields in the opposite front corner thereof, said shields combining when in their operative positions to span the width of the windshield, one of said shields extending past the mid-width of the automobile, and one of them being provided with a slot positioned to straddle the shank of a rear vision mirror when the slotted shield is adjusted to an operative position with its slotted portion rearward of said mirror, each of said shields when in its operative position having at its free end a vertical edge which abuts the corresponding edge of the other shield.

3. As an article of manfacture, an elongated glare shield plate having a recess in one of its corner portions thereby narrowing the width of the end portion of the plate in which said recess is located, and a rod of less width than said recess projecting thereinto, the projecting end portion of said rod being shaped to form a mounting means for a universal joint connection for adjustably mounting said plate, the body portion of said plate being extended in an endwise manner in an adjacent slightly spaced relation to the projecting part of said rod to a greater distance than the latter projects.

4. An elongated glare shield plate member having a recess in one of its corner portions thereby narrowing the width of the end portion of the plate in which said recess is located, a rod of less width than said recess projecting into the outer portion of said recess, means to pivotally mount the projecting end portion of said rod upon the frame of an automobile adjacent to an upper corner of a windshield, said member to extend from the outer end of said recess to a point beyond the mid-width of the automobile, said member having a slotted edge portion to straddle the shank of a rear vision mirror mounted at the mid-width of the automobile.

5. Shield means to span the width of the windshield of an automobile to prevent glare entering the driver's compartment of an automobile, comprising a pair of elongated plate-like shields, each having a recess in one of its corner portions thereby narrowing the width of the end portion of the plate in which said recess is located, means occupying each said recess to pivotally mount one end portion of each shield upon the frame of an automobile adjacent to opposite upper corners of a windshield, one of said shields comprising a main shield, and the other shield comprising a shield of shorter length than said main shield, said main shield extending in one direction from a point beyond its pivotal mounting and in the opposite direction to a point beyond the mid-width of the automobile, said main shield having a slotted edge portion to straddle the shank of a rear vision mirror mounted in the center of the automobile, each of said shields in their operative positions having their free end edges abuttable against each other.

6. The combination with a rear vision mirror having a shank supporting it in a rearwardly spaced relation to the vertex of the intersecting panes of a V-type windshield of an automobile; of a glare shield for shielding the glare in the portion of the V area of the windshield adjacent to said mirror including the entire area rearward of the windshield panes, said shield having a slotted edge portion to straddle the shank of said rear vision mirror when in the operative position, and means for pivotally mounting one end portion of said shield upon the frame of said automobile adjacent to an upper corner of said windshield, said shield being provided with a hinge whose pivot alines with said slot, the free end portion of said shield extending beyond said slot being fastened to said hinge to swing in a parallel relation to the pane of the windshield adjacent the free end portion of said shield.

7. In combination, a main elongated glare shield member, means for pivotally mounting one end portion of said member upon the frame of an automobile adjacent to an upper corner of a windshield, said member being of a sufficient length to extend from its pivotal mounting to a point beyond the mid-width of the automobile, a shorter elongated glare shield member similarly mountable adjacent the upper corner of the opposite end of the windshield with its free end edge abuttable against the free end edge of the aforesaid main glare shield member, said main member having a slotted edge portion to straddle the shank of a rear vision mirror mounted in the center of the automobile, said main shield having a flexion joint alining with said slot and extending from the inner end of said slot to the opposite edge of said shield.

8. A glare shield consisting of an elongated plate having a slotted edge portion, and means to mount said shield on an automobile frame for swinging to and from a downwardly directed position in which position its slotted part will straddle the shank of a conventional rear vision mirror, said shield having a flap which is hinged to its free end portion adjacent to said slot.

9. As an article of manufatcure, an elongated glare shield plate having a recess in one of its corner portions thereby narrowing the width of the end portion of the plate in which said recess is located, and a rod of less width than said recess projecting thereinto, the body portion of said plate being extended in an endwise manner in an adjacent slightly spaced relation to the projecting part of said rod to a greater distance than the latter projects.

10. As an article of manufacture, an elongated glare shield plate having a recess in one of its corner portions thereby narrowing the width of the extending body end portion of the plate in which said recess is located, a rod of less width than said recess projecting thereinto, and means to pivotally mount the projecting end portion of said rod upon the frame of an automobile adjacent to an upper corner of the windshield thereof whereby such extension body end portion when in the operative position underlyingly projects beyond said pivotal means.

11. Shield means to span the width of the windshield of an automobile to prevent glare entering the driver's compartment of an automobile, comprising a pair of elongated plate-like shields, each having a recess in one of its corner portions thereby narrowing the width of the end portion of the plate in which said recess is located, means occupying each said recess to pivotally mount one end portion of each shield upon the frame of an automobile adjacent to opposite upper corners of a windshield, one of said shields comprising a main shield and the other shield comprising a shield of a shorter length than said main shield, said main shield extending in one direction from a point beyond its pivotal mounting and in the opposite direction to a point beyond the mid-width of the automobile, each of said shields in their operative positions having their free end edges abuttable against each other.

12. Shield means to span the width of the windshield of an automobile to prevent glare entering the driver's compartment of an automobile, comprising a pair of elongated plate-like shields, each having a recess in one of its corner portions thereby narrowing the width of the end portion of the plate in which said recess is located, and means occupying each said recess to pivotally mount one end portion of each shield upon the frame of an automobile adjacent to opposite upper corners of a windshield, said shields combining when in their operative positions to span the width of the windshield, each of said shields when in its operative position having at its free end an edge which abuts the corresponding edge of the other shield.

13. In combination, a glare shield member consisting of an elongated plate, and means for pivotally mounting one end portion of said member upon the frame of an automobile adjacent to an upper corner of a windshield, said member being of sufficient length to extend from its pivotal mounting to a point beyond the mid width of the automobile, said member having a slotted edge portion to straddle the shank of a rear vision mirror mounted in the center of the automobile when said member is rotated to a glare obstructing position and to in the latter position be supported by such shank.

SOLOMON M. LEVY.